(12) United States Patent
Lee et al.

(10) Patent No.: US 7,390,970 B2
(45) Date of Patent: Jun. 24, 2008

(54) CABLE SEMICONDUCTING SHIELD

(75) Inventors: Wei-Kuo Lee, Bridgewater, NJ (US);
Marios Avgousti, Plainsboro, NJ (US);
Suh Joon Han, Branchburg, NJ (US)

(73) Assignee: Union Carbide Chemicals & Plastics Technology Corporation, Midland, TX (US)

( * ) Notice: Subject to any disclaimer, the term of this patent is extended or adjusted under 35 U.S.C. 154(b) by 11 days.

(21) Appl. No.: 10/813,367

(22) Filed: Mar. 30, 2004

(65) Prior Publication Data

US 2005/0064177 A1    Mar. 24, 2005

Related U.S. Application Data

(63) Continuation-in-part of application No. 09/311,480, filed on May 13, 1999, now abandoned.

(51) Int. Cl.
*H01B 1/00* (2006.01)
(52) U.S. Cl. .................................. 174/102 SC
(58) Field of Classification Search ........... 174/102 SC, 174/105 SC, 106 SC, 120 SC
See application file for complete search history.

(56) References Cited

U.S. PATENT DOCUMENTS

| | | | |
|---|---|---|---|
| 4,286,023 A | 8/1981 | Ongchin | 428/516 |
| 4,317,001 A | 2/1982 | Silver et al. | 174/102 SC |
| 4,717,505 A | 1/1988 | Delphin et al. | 252/511 |
| 4,857,232 A * | 8/1989 | Burns, Jr. | 252/511 |
| 4,923,637 A | 5/1990 | Yagi et al. | 252/511 |
| 5,591,382 A | 1/1997 | Nahass et al. | 252/511 |
| 5,651,922 A | 7/1997 | Nahass et al. | 252/511 |
| 5,707,916 A | 1/1998 | Snyder et al. | 502/180 |
| 5,908,585 A | 6/1999 | Shibata | 428/516 |
| 6,183,714 B1 * | 2/2001 | Smalley et al. | 423/447.3 |
| 6,225,565 B1 * | 5/2001 | Prysner | 174/120 SC |
| 6,465,561 B1 * | 10/2002 | Yarbrough et al. | 524/496 |

FOREIGN PATENT DOCUMENTS

| | | |
|---|---|---|
| EP | 0420271 A1 | 9/1990 |
| WO | 90/10296 | 9/1990 |
| WO | 90/12842 | 11/1990 |

OTHER PUBLICATIONS

"Tiny Graphite 'tubes' create high-efficiency conductive plastics", B. Miller, *Plastics World*, Sep. 1996, pp. 73-77.
"Low loading of graphite 'fibrils' yields high level of conductivity", J. Grande, *Plastics World*, Oct. 1997, pp. 40-41.

* cited by examiner

*Primary Examiner*—Chau N. Nguyen
(74) *Attorney, Agent, or Firm*—Whyte Hirschboeck Dudek SC

(57) ABSTRACT

A cable comprising one or more electrical conductors or communications media or a core of two or more electrical conductors or communications media, each electrical conductor, communications medium, or core being surrounded by a layer comprising:
(a) polyethylene; polypropylene; or mixtures thereof;
(b) carbon nanotubes;
(c) a conductive carbon black other than carbon nanotubes; and
(d) optionally, a copolymer of acrylonitrile and butadiene wherein the acrylonitrile is present in an amount of about 30 to about 60 percent by weight based on the weight of the copolymer or a silicone rubber.

2 Claims, 2 Drawing Sheets

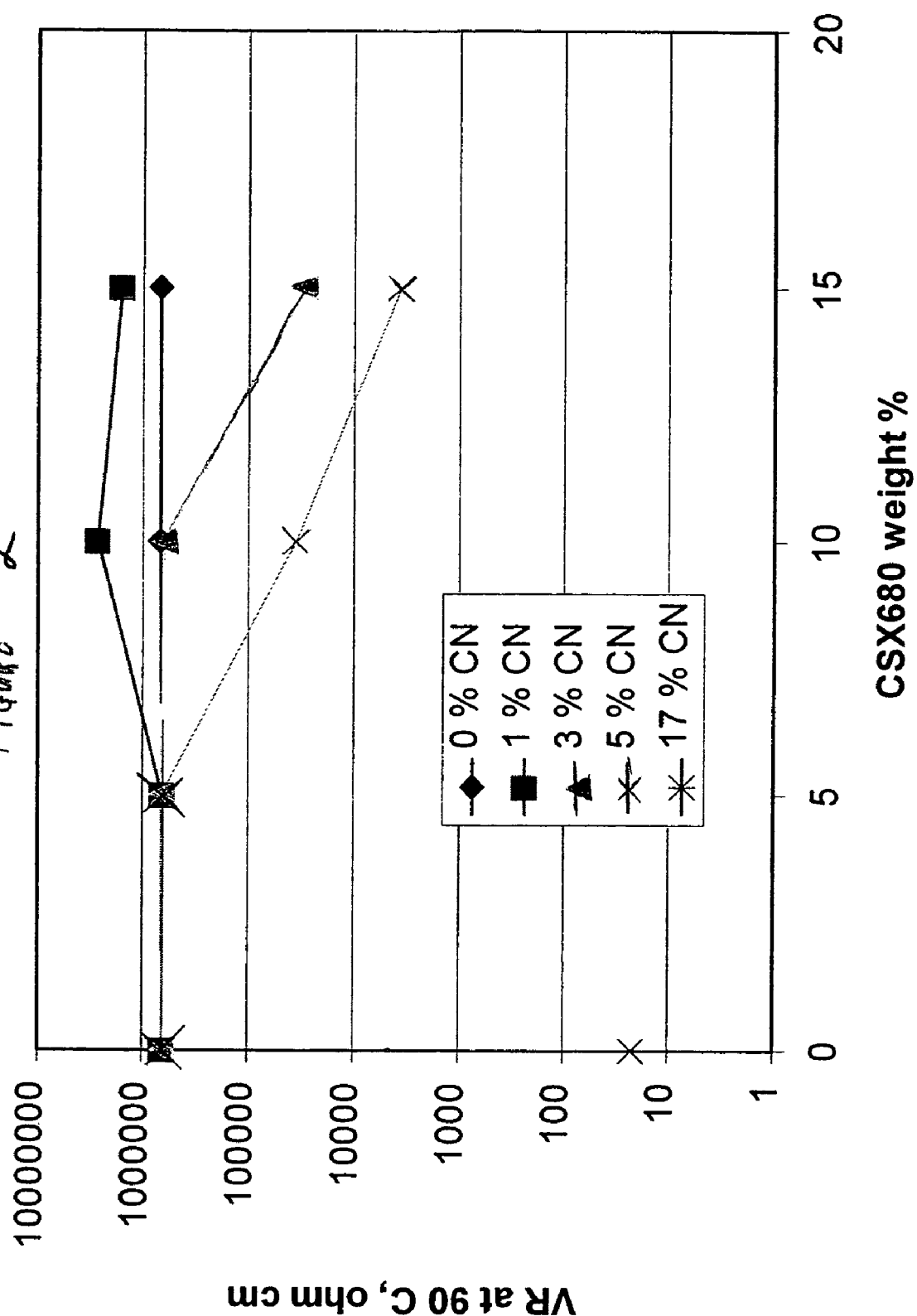

CABLE SEMICONDUCTING SHIELD

CROSS-REFERENCE TO RELATED APPLICATIONS

This application is a continuation-in-part of U.S. Ser. No. 09/311,480, filed May 13, 1999 now abandoned.

TECHNICAL FIELD

This invention relates mainly to a power cable having a semiconducting shield.

BACKGROUND INFORMATION

A typical electric power cable generally comprises one or more conductors in a cable core that is surrounded by several layers of polymeric materials including a first semiconducting shield layer (conductor or strand shield), an insulating layer, a second semiconducting shield layer (insulation shield), a metallic tape or wire shield, and a protective jacket. The outer semiconducting shield can be either bonded to the insulation or strippable, with most applications using strippable shields. Additional layers within this construction such as moisture impervious materials are often incorporated.

Polymeric semiconducting shields have been utilized in multilayered power cable construction for many decades. Generally, they are used to fabricate solid dielectric power cables rated for voltages greater than 1 kilo Volt (kV). These shields are used to provide layers of intermediate conductivity between the high potential conductor and the primary insulation, and between the primary insulation and the ground or neutral potential. The volume resistivity of these semiconducting materials is typically in the range of $10^{-1}$ to $10^8$ ohm-cm when measured on a completed power cable construction using the methods described in ICEA S-66-524, section 6.12, or IEC 60502-2 (1997), Annex C. Typical strippable shield compositions contain a polyolefin, such as ethylene/vinyl acetate copolymer with a high vinyl acetate content, conductive carbon black, an organic peroxide crosslinking agent, and other conventional additives such as a nitrile rubber, which functions as a strip force reduction aid, processing aids, and antioxidants. These compositions are usually prepared in granular or pellet form. Polyolefin formulations such as these are disclosed in U.S. Pat. No. 4,286,023 and European Patent Application 420 271. The shield composition is, typically, introduced into an extruder where it is co-extruded around an electrical conductor at a temperature lower than the decomposition temperature of the organic peroxide to form a cable. The cable is then exposed to higher temperatures at which the organic peroxide decomposes to provide free radicals, which crosslink the polymer.

In order to provide a semiconducting shield it is necessary to incorporate conductive particles into the composition. These conductive particles have been generally provided by particulate carbon black. Useful carbon blacks can have a surface area of about 50 to about 1000 square meters per gram. The surface area is determined under ASTM D 4820-93a (Multipoint B.E.T. Nitrogen Adsorption). The carbon blacks have been used in the semiconducting shield composition in an amount of about 20 to about 60 percent by weight based on the weight of the composition, and are preferably used in an amount of about 25 to about 45 percent by weight. Both standard conductivity and high conductivity carbon blacks are used with standard conductivity blacks being preferred. Examples of conductive carbon blacks are the grades described by ASTM N550, N472, N351, N110, Ketjen blacks, and acetylene blacks.

Industry is constantly attempting to select carbon blacks, which, at a moderate cost, will improve cable strength and provide more efficient conductivity.

DISCLOSURE OF THE INVENTION

An object of this invention, therefore, is to provide a cable having an improved semiconducting shield in terms of structure and conductivity. Other objects and advantages will become apparent hereinafter.

According to the invention, such a cable has been discovered. The cable comprises one or more electrical conductors or communications media or a core of two or more electrical conductors or communications media, each electrical conductor, communications medium, or core being surrounded by a layer comprising:

(a) polyethylene; polypropylene; or mixtures thereof;
(b) carbon nanotubes;
(c) a conductive carbon black other than carbon nanotubes; and
(d) optionally, a copolymer of acrylonitrile and butadiene wherein the acrylonitrile is present in an amount of about 30 to about 60 percent by weight based on the weight of the copolymer or a silicone rubber.

BRIEF DESCRIPTION OF THE FIGURES

FIG. 2 is a graph of volume resistivity of the semiconducting compositions of FIG. 1.

DESCRIPTION OF THE PREFERRED EMBODIMENT(S)

Figure 1:
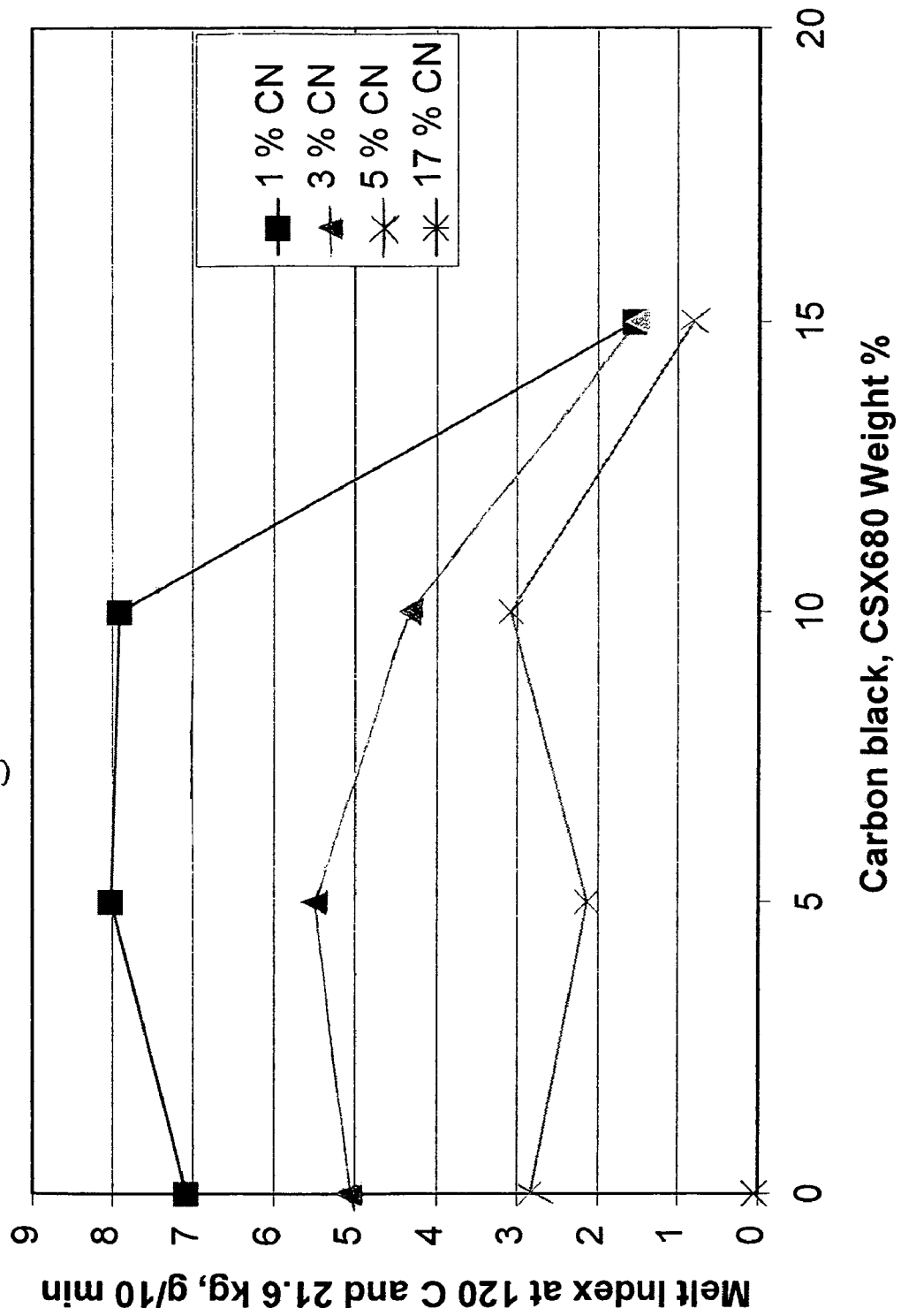
FIG. 1 is a graph of the melt index of semiconducting polymer compositions having various loading levels of carbon black and carbon nanotubes.

Polyethylene, as that term is used herein, is a homopolymer of ethylene or a copolymer of ethylene and a minor proportion of one or more alpha-olefins having 3 to 12 carbon atoms, and preferably 4 to 8 carbon atoms, and, optionally, a diene, or a mixture or blend of such homopolymers and copolymers. The mixture can be a mechanical blend or an in situ blend of two or more polymers. Examples of the alpha-olefins are propylene, 1-butene, 1-hexene, 4-methyl-1-pentene, and 1-octene. The polyethylene can also be a copolymer of ethylene and an unsaturated ester such as a vinyl ester, e.g., vinyl acetate or an acrylic or methacrylic acid ester, which are preferably used in semiconducting shields.

The polyethylene can be homogeneous or heterogeneous. The homogeneous polyethylenes usually have a polydispersity (Mw/Mn) in the range of about 1.5 to about 3.5 and an essentially uniform comonomer distribution, and are characterized by single and relatively low DSC melting points. The heterogeneous polyethylenes, on the other hand, have a polydispersity (Mw/Mn) greater than 3.5 and do not have a uniform comonomer distribution. Mw is defined as weight average molecular weight and Mn is defined as number average molecular weight. The polyethylenes can have a density in the range of 0.860 to 0.950 gram per cubic centimeter, and preferably have a density in the range of 0.870 to about 0.930 gram per cubic centimeter. They also can have a melt index in the range of about 0.1 to about 50 grams per 10 minutes.

The polyethylenes can be produced by low or high pressure processes. They are preferably produced in the gas phase, but they can also be produced in the liquid phase in solutions or slurries by conventional techniques. Low pressure processes are typically run at pressures below 1000 psi (pounds per square inch) whereas high pressure processes are typically run at pressures above 15,000 psi.

Typical catalyst systems, which can be used to prepare these polyethylenes, are magnesium/titanium based catalyst systems, which can be exemplified by the catalyst system described in U.S. Pat. No. 4,302,565 (heterogeneous polyethylenes); vanadium based catalyst systems such as those described in U.S. Pat. No. 4,508,842 (heterogeneous polyethylenes) and U.S. Pat. Nos. 5,332,793; 5,342,907; and 5,410,003 (homogeneous polyethylenes); a chromium based catalyst system such as that described in U.S. Pat. No. 4,101,445; a metallocene catalyst system such as those described in U.S. Pat. Nos. 4,937,299, 5,272,236, 5,278,272, and 5,317,036 (homogeneous polyethylenes); or other transition metal catalyst systems. Many of these catalyst systems are often referred to as Ziegler-Natta catalyst systems or Phillips catalyst systems. Catalyst systems, which use chromium or molybdenum oxides on silica-alumina supports, can be included here. Typical processes for preparing the polyethylenes are also described in the aforementioned patents. Typical in situ polyethylene blends and processes and catalyst systems for providing same are described in U.S. Pat. Nos. 5,371,145 and 5,405,901. The various polyethylenes can include low density homopolymers of ethylene made by high pressure processes (HP-LDPEs), linear low density polyethylenes (LLDPEs), very low density polyethylenes (VLDPEs), medium density polyethylenes (MDPEs), high density polyethylene (HDPE) having a density greater than 0.940 gram per cubic centimeter and metallocene copolymers with densities less than 0.900 gram per cubic centimeter. The latter are generally made by low pressure processes. A conventional high pressure process is described in Introduction to Polymer Chemistry, Stille, Wiley and Sons, New York, 1962, pages 149 to 151. The high pressure processes are typically free radical initiated polymerizations conducted in a tubular reactor or a stirred autoclave. In the stirred autoclave, the pressure is in the range of about 10,000 to 30,000 psi and the temperature is in the range of about 175 to about 250 degrees C., and in the tubular reactor, the pressure is in the range of about 25,000 to about 45,000 psi and the temperature is in the range of about 200 to about 350 degrees C.

HP-LDPE and the copolymers of ethylene and unsaturated esters are generally made by these high pressure processes. Blends with metallocene resins can also be used, the former component because of its excellent processability and the latter because of its flexibility.

As noted, the copolymers comprised of ethylene and unsaturated esters can be prepared by the conventional high pressure techniques described above and are preferred for semiconducting shields. The unsaturated esters can be alkyl acrylates, alkyl methacrylates, and vinyl carboxylates. The alkyl group can have 1 to 8 carbon atoms and preferably has 1 to 4 carbon atoms. The carboxylate group can have 2 to 8 carbon atoms and preferably has 2 to 5 carbon atoms. In semiconducting shields, the portion of the copolymer attributed to the ester comonomer can be in the range of about 10 to about 55 percent by weight based on the weight of the copolymer, and is preferably in the range of about 35 to about 55 percent by weight. The ester can have about 4 to about 20 carbon atoms, and preferably has about 4 to about 7 carbon atoms. Examples of vinyl esters (or carboxylates) are vinyl acetate, vinyl butyrate, vinyl pivalate, vinyl neononanoate, vinyl neodecanoate, and vinyl 2-ethylhexanoate. Vinyl acetate is preferred. Examples of acrylic and methacrylic acid esters are lauryl methacrylate; myristyl methacrylate; palmityl methacrylate; stearyl methacrylate; 3-methacryloxy-propyltrimethoxysilane; 3-methacryloxypropyltriethoxysilane; cyclohexyl methacrylate; n-hexylmethacrylate; isodecyl methacrylate; 2-methoxyethyl methacrylate; tetrahydrofurfuryl methacrylate; octyl methacrylate; 2-phenoxyethyl methacrylate; isobornyl methacrylate; isooctylmethacrylate; octyl methacrylate; isooctyl methacrylate; oleyl methacrylate; ethyl acrylate; methyl acrylate; t-butyl acrylate; n-butyl acrylate; and 2-ethylhexyl acrylate. Methyl acrylate, ethyl acrylate, and n- or t-butyl acrylate are preferred. The alkyl group can be substituted with an oxyalkyltrialkoxysilane, for example. The copolymers can have a density in the range of 0.900 to 0.990 gram per cubic centimeter, and preferably have a density in the range of 0.920 to 0.970 gram per cubic centimeter. The copolymers can also have a melt index in the range of about 0.1 to about 100 grams per 10 minutes, and preferably have a melt index in the range of about 1 to about 50 grams per 10 minutes. One process for the preparation of a copolymer of ethylene and an unsaturated ester is described in U.S. Pat. No. 3,334,081.

The VLDPE can be a copolymer of ethylene and one or more alpha-olefins having 3 to 12 carbon atoms and preferably 3 to 8 carbon atoms. The density of the VLDPE can be in the range of 0.870 to 0.915 gram per cubic centimeter. It can be produced, for example, in the presence of (i) a catalyst containing chromium and titanium, (ii) a catalyst containing magnesium, titanium, a halogen, and an electron donor; or (iii) a catalyst containing vanadium, an electron donor, an alkyl aluminum halide modifier, and a halocarbon promoter. Catalysts and processes for making the VLDPE are described, respectively, in U.S. Pat. Nos. 4,101,445; 4,302,565; and 4,508,842. The melt index of the VLDPE can be in the range of about 0.1 to about 100 grams per 10 minutes and is preferably in the range of about 1 to about 50 grams per 10 minutes. The portion of the VLDPE attributed to the comonomer(s), other than ethylene, can be in the range of about 1 to about 49 percent by weight based on the weight of the copolymer and is preferably in the range of about 15 to about 40 percent by weight. A third comonomer can be included, e.g., another alpha-olefin or a diene such as ethylidene norbornene, butadiene, 1,4-hexadiene, or a dicyclopentadiene. Ethylene/propylene copolymers and ethylene/propylene/diene terpolymers are generally referred to as EPRs and the terpolymer is generally referred to as an EPDM. The third comonomer can be present in an amount of about 1 to 15 percent by weight based on the weight of the copolymer and is preferably present in an amount of about 1 to about 10 percent by weight. It is preferred that the copolymer contain two or three comonomers inclusive of ethylene.

The LLDPE can include the VLDPE and MDPE, which are also linear, but, generally, has a density in the range of 0.916 to 0.925 gram per cubic centimeter. It can be a copolymer of ethylene and one or more alpha-olefins having 3 to 12 carbon atoms, and preferably 3 to 8 carbon atoms. The melt index can be in the range of about 0.1 to about 100 grams per 10 minutes, and is preferably in the range of about 1 to about 50 grams per 10 minutes. The alpha-olefins can be the same as those mentioned above, and the catalysts and processes are also the same subject to variations necessary to obtain the desired densities and melt indices.

As noted, included in the definition of polyethylene are homopolymers of ethylene made by a conventional high pressure process. The homopolymer preferably has a density in the range of 0.910 to 0.930 gram per cubic centimeter. The homopolymer can also have a melt index in the range of about 1 to about 5 grams per 10 minutes, and preferably has a melt index in the range of about 0.75 to about 3 grams per 10 minutes.

Melt index is determined in accordance with ASTM D-1238, Condition E, measured at 190 degrees C.

The polyethylenes can be made moisture curable by making the resin hydrolyzable, which is accomplished by adding hydrolyzable groups such as —Si(OR)$_3$ wherein R is a hydrocarbyl radical to the resin structure through copolymerization or grafting. Suitable crosslinking agents are organic peroxides such as dicumyl peroxide; 2,5-dimethyl-2,5-di(t-butylperoxy)hexane; t-butyl cumyl peroxide; and 2,5-dimethyl-2,5-di(t-butylperoxy)hexane-3. Dicumyl peroxide is preferred. Hydrolyzable groups can be added, for example, by copolymerizing ethylene with an ethylenically unsaturated compound having one or more —Si(OR)$_3$ groups such as vinyltrimethoxysilane, vinyltriethoxysilane, and gamma-methacryloxypropyltrimethoxy-silane or grafting these silane compounds to the resin in the presence of the aforementioned organic peroxides. The hydrolyzable resins are then crosslinked by moisture in the presence of a silanol condensation catalyst such as dibutyltin dilaurate, dioctyltin maleate, dibutyltin diacetate, stannous acetate, lead naphthenate, and zinc caprylate. Dibutyltin dilaurate is preferred. Examples of hydrolyzable copolymers and hydrolyzable grafted copolymers are ethylene/vinyltrimethoxy silane copolymer, ethylene/gamma-methacryloxypropyltrimethoxy silane copolymer, vinyltrimethoxy silane grafted ethylene/ethyl acrylate copolymer, vinyltrimethoxy silane grafted linear low density ethylene/1-butene copolymer, and vinyltrimethoxy silane grafted low density polyethylene.

In applications where moisture cured insulation is used, it is desirable to provide a moisture cured strippable semiconducting shield to protect the insulation. The shield composition would then be prepared in the same manner as the moisture cured insulation as outlined above.

With respect to polypropylene: homopolymers and copolymers of propylene and one or more other alpha-olefins wherein the portion of the copolymer based on propylene is at least about 60 percent by weight based on the weight of the copolymer can be used by themselves or in admixture with polyethylene. The polypropylene can be prepared by conventional processes such as the process described in U.S. Pat. No. 4,414,132. The alpha-olefins in the copolymer are preferably those having 2 or 4 to 12 carbon atoms.

Component (b) carbon nanotubes are made of carbon and are high strength sub-micron sized fibril particles having a graphitic morphological structure and configuration (an entangled three dimensional network). They have been referred to as carbon fibrils and graphite fibrils, and can be prepared as described in U.S. Pat. No. 5,707,916.

A typical carbon nanotube can be described as a tube made up of eight layers of rolled-up graphite sheets having a hollow core 0.005 micron in diameter and an outer diameter of 0.01 micron (100 Angstroms). The length of the tube is 1 to 10 microns. Each of the graphite layers is made up of carbon atoms. The tube is not straight, but can be acicular or serpentine. They usually appear as a plurality of intertwined or entangled fibers; are of high strength; and have a high level of electrical conductivity. Graphite fibrils are vapor grown graphitic carbon nanotubes. They are produced as agglomerates somewhat like steel wool pads although, of course, on a much smaller scale. The carbon nanotubes have a black color and their composition is essentially pure carbon with a trace of residual metal oxide catalyst, which means that they can be considered clean with a low concentration of metal ions. Because of their porous structure, they have a very low bulk density, i.e., about 0.10 gram per cubic centimeter or 6.24 pounds per cubic foot; the BET surface area is about 250 square meters per gram; and the DBP Absorption is 450 cubic centimeter per 100 grams.

The carbon nanotubes can be used in amounts of at least about 3 parts by weight per 100 parts by weight of component (a), and are preferably used in amounts of 3 to about 17 parts by weight. The weight ratio of carbon nanotubes to conductive carbon black can be about 0.1:1 to about 10:1, and the total of carbon nanotubes and other conductive carbon black can be in the range of about 13 to about 117 parts by weight per 100 parts by weight of component (a).

Component (c) can be a conventional conductive carbon black commonly used in semiconducting shields. These carbon blacks are described above. Subject to the above weight ratios and parts by weight, the conductive carbon black other than carbon nanotubes can be used in amounts of at least about 10 to about 100 parts by weight per 100 parts by weight of component (a). Preferably, the conductive carbon black will be present in an amount of about 10 to about 100 parts by weight per 100 parts by weight of component (a), and more preferably, in an amount of about 10 to about 80.

Component (d) is optional. It can be a copolymer of acrylonitrile and butadiene wherein the acrylonitrile is present in an amount of about 30 to about 60 percent by weight based on the weight of the copolymer, and is preferably present in an amount of about 40 to about 50 percent by weight. This copolymer is also known as a nitrile rubber or an acrylonitrile/butadiene copolymer rubber. The density can be, for example, 0.98 gram per cubic centimeter and the Mooney Viscosity can be (ML 1+4) 50. Component (d) can also be a silicone rubber. The components are commonly used in semiconducting shields.

For each 100 parts by weight of component (a), i.e., polyethylene, polypropylene, or mixtures thereof, the other components can be present in about the following values (in parts by weight):

| component | broad range | preferred range |
| --- | --- | --- |
| (b) carbon nanotubes | At least 3 | 3 to 17 |
| (c) conductive carbon black | At least about 10 | 10 to 100 |
| (d) nitrile rubber* or silicone rubber (optional) | 10 to 60 1 to 10 | 15 to 45 3 to 8 |
| weight ratio of (b) to (c) | 0.1:1 to 10:1 | 0.2:1 to 3:1 |

*nitrile rubber is a copolymer of acrylonitrile and butadiene.

Component (a) can be crosslinked. This is accomplished in a conventional manner with an organic peroxide or irradiation, the former being preferred. The amount of organic peroxide used can be in the range of about 0.15 to about 0.8 part by weight of organic peroxide for each 100 parts by weight of component (a), and is preferably in the range of about 0.3 to about 0.6 part by weight. Organic peroxide crosslinking temperatures can be in the range of about 130 to about 250 degrees C. and are preferably in the range of about 140 to about 210 degrees C.

Examples of organic peroxides useful in crosslinking are dicumyl peroxide; t-butyl cumyl, peroxide; lauroyl peroxide; benzoyl peroxide; tertiary butyl perbenzoate; di(tertiary-butyl) peroxide; cumene hydroperoxide; 2,5-dimethyl-2,5-di(t-butyl-peroxy)hexyne-3; 2,5-dimethyl-2,5-di(t-butyl-peroxy) hexane; tertiary butyl hydroperoxide; isopropyl percarbonate; and alpha, alpha'-bis(tertiary-butylperoxy)diisopropylbenzene.

Another form of crosslinking is by irradiation, typically by electron beam. The composition in pellet form is subjected to an electron beam at a given dose rate or exposed to a Gamma source of specific strength for a given period of time to impart a specific dose rate of radiation.

Conventional additives, which can be introduced into the composition, are exemplified by antioxidants, coupling agents, ultraviolet absorbers or stabilizers, antistatic agents, pigments, dyes, nucleating agents, reinforcing fillers or polymer additives, slip agents, plasticizers, processing aids, lubricants, viscosity control agents, tackifiers, anti-blocking agents, surfactants, extender oils, metal deactivators, voltage stabilizers, flame retardant fillers and additives, crosslinking agents, boosters, and catalysts, and smoke suppressants. Additives and fillers can be added in amounts ranging from less than about 0.1 to more than about 50 percent by weight based on the weight of the composition.

Examples of antioxidants are: hindered phenols such as tetrakis[methylene(3,5-di-tert-butyl-4-hydroxyhydro-cinnamate)]methane, bis[(beta-(3,5-ditert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl) phosphite and di-tert-butylphenyl-phosphonite; thio compounds such as dilaurylthiodipropionate, dimyristylthiodipropionate, and distearylthiodipropionate; various siloxanes; and various amines such as polymerized 2,2,4-trimethyl-1,2-dihydroquinoline, 4,4'-bis(alpha,alpha-demthylbenzyl)diphenylamine, and alkylated diphenylamines. Antioxidants can be used in amounts of about 0.1 to about 5 percent by weight based on the weight of the composition.

Compounding can be effected in a conventional melt/mixer or in a conventional extruder, and these terms are used in this specification interchangeably. Generally, the conductive shield composition is prepared in a melt/mixer and then pelletized using a pelletizer attachment or an extruder adapted for pelletizing. Both the melt/mixer, as the name implies, and the extruder, in effect, have melting and mixing zones although the various sections of each are known to those skilled in the art by different names. The semiconducting shield composition of the invention can be prepared in various types of melt/mixers and extruders such as a Brabender™ mixer, Banbury™ mixer, a roll mill, a Buss™ co-kneader, a biaxial screw kneading extruder, and single or twin screw extruders. A description of a conventional extruder can be found in U.S. Pat. No. 4,857,600. In addition to melt/mixing, the extruder can coat a wire or a core of wires. An example of co-extrusion and an extruder therefor can be found in U.S. Pat. No. 5,575,965. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. In wire coating, where the material is crosslinked after extrusion, the die of the crosshead feeds directly into a heating zone, and this zone can be maintained at a temperature in the range of about 120° C. to about 260° C., and preferably in the range of about 140° C. to about 220° C.

The combination of carbon nanotubes and another conductive carbon black provides a lower total cost; a cleaner composition; lower filler loadings; higher production rates; easier manufacturing and end use compounding; and better mechanical and electrical properties than carbon black alone. The basis for the advantages of the combination is that 1 part by weight of carbon nanotubes provides conductivity roughly equal to about 7.5 parts by weight of conductive carbon black. Further, there can be a synergistic effect between the carbon nanotubes and the conductive carbon blacks with respect to electrical properties, particularly conductivity, which is found to change less with time than systems containing only conductive carbon blacks, and it appears that the carbon nanotube blends are more stable. There is also a benefit with respect to rheological properties in terms of lower shear viscosity, which can lower power needs in compounding; improve processibility; and lower extrusion temperatures resulting in better thermal stability. Volume resistivity is adequate at lower viscosities, and shows very small change with temperature, which is advantageous for lower dissipation factor. It is expected that the carbon nanotubes will disperse better than the Ketjen blacks.

Carbon nanotubes can also be used in the insulation layer in amounts of about 0.01 to about 1 part by weight per 100 parts by weight of component (a), i.e., polyethylene, polypropylene, or mixtures thereof, and is preferably used in the insulation layer in amounts of about 0.05 to about 0.3 part by weight. The advantages of using carbon nanotubes in the insulation layer are reduction or prevention of water treeing and increasing breakdown strength by dissipating electric energy or reducing electric stress.

The term "surrounded" as it applies to a substrate being surrounded by an insulating composition, jacketing material, semiconducting shield, or other cable layer is considered to include extruding around the substrate; coating the substrate; or wrapping around the substrate as is well known by those skilled in the art. The substrate can include, for example, a core including a conductor or a bundle of conductors, or various underlying cable layers as noted above. The conductors can be electrical such as copper or communications media such as fiber optics made up of glass fibers.

All molecular weights mentioned in this specification are weight average molecular weights unless otherwise designated.

The patents mentioned in this specification are incorporated by reference herein.

The invention is illustrated by the following examples:

EXAMPLES 1 TO 4

Products suitable for semiconductive shielding and of electrical power cables are prepared at various ratios of conductive carbon black and carbon nanotubes. The viscosity and electrical properties of these compositions are then measured.

Example 1 is a material which is known in the art to be useful for semiconductive shielding of electrical power cables. This material is made from 60 weight percent, with respect to the weight of the composition, of ethylene/ethyl acrylate which is a copolymer of ethylene and ethyl acrylate having an 18 percent by weight ethylene acrylate content and a melt index of 20 grams per 10 minutes. Example 1 also contains 38 weight percent of commercially available conductive carbon black, Denka Granules, which is an acetylene black having a surface area of 60 square meters per gram determined under ASTM D 4820-93a (Multipoint B.E.T. Nitrogen Adsorption). Polymerized 2,2,4-trimethyl-1,2-dihydroquinoline is an antioxidant added at 1 weight percent, and the processing additive, polyethylene glycol, is also added at 1 weight percent. The composition of Example 1 is shown in Table 1.

Example 2 is a commercially available mixture of carbon nanotubes with polyethylene. The composition contains 78 weight percent, with respect to the weight of the composition, of a linear low density polyethylene (LLDPE) having a density of 0.92 gram per cubic centimeter and a melt index of 20 grams per 10 minutes. Example 2 also contains 20 weight percent of carbon nanotubes. This composition also contains approximately 1 weight percent of antioxidant. The composition of Example 2 is shown in Table 1

Examples 3 and 4 are prepared by blending the compositions of Examples 1 and 2 with a 30 millimeter laboratory scale twin screw mixing device. Example 3 is a blend of Examples 1 and 2 in a ratio of 75:25. Example 4 is a blend of Examples 1 and 2 in a ratio of 50:50. The compositions of Examples 3 and 4 are shown in Table 1.

The apparent shear viscosities of Examples 1 to 4 are measured with a piston driven capillary rheometer, Göttfert Rheograph™ model 2001. The capillary die is 1 millimeter in diameter, and 20 millimeters in length. The test temperature is 125 degrees C., which is similar to the temperature at which commercial peroxide crosslinkable semiconductive materials are extruded for shielding of electrical power cables. The piston velocity is varied to obtain an apparent shear rate from 90 to 900 sec$^{-1}$, also a representative range for commercial extrusion processes used for semiconductive shielding products. The pressure drop across the capillary die is measured with a single pressure transducer. The viscosity is calculated from die dimensions, the piston cross section, piston velocity, and the pressure drop across the die. The results of these measurements are compiled in Table 1.

TABLE 1

| Example Number | 1 | 2 | 3 | 4 |
|---|---|---|---|---|
| Composition, weight percent | | | | |
| Ethylene/Ethyl Acrylate | 60.0 | 0.0 | 45.0 | 30.0 |
| LLDPE | 0.0 | 79.0 | 19.8 | 39.5 |
| Carbon Black | 38.0 | 0.0 | 28.5 | 19.0 |
| Carbon Nanotubes | 0.0 | 20.0 | 5.0 | 10.0 |
| Antioxidant | 1.0 | 1.0 | 1.0 | 1.0 |
| Process aid | 1.0 | 0.0 | 0.8 | 0.5 |
| Total: | 100.0 | 100.0 | 100.0 | 100.0 |
| Viscosity, Pascal * seconds | | | | |
| at 90 sec$^{-1}$ shear rate | 3470 | 4480 | 1770 | 2520 |
| at 180 sec$^{-1}$ shear rate | 2360 | 2940 | 1170 | 1560 |
| at 360 sec$^{-1}$ shear rate | 1570 | 1810 | 840 | 1000 |
| at 900 sec$^{-1}$ shear rate | 858 | 875 | 506 | 557 |

The viscosity of Example 1 at 360 sec$^-$ shear rate, 1570 Pascal seconds, is very typical for commercial products useful as semiconductive shielding for power cables. This viscosity is dictated by the dual requirements of high molecular weight to maintain adequate mechanical properties, and sufficient carbon black to ensure adequately low volume resistivity. The viscosities of Example 3 and Example 4 are significantly lower than Example 1, which is advantageous for the manufacturing of insulated power cables.

EXAMPLES 5 TO 8

Examples 5 to 8 are prepared by adding 1.1 weight percent, with respect to the weight of the composition, of dicumyl peroxide. The materials are then compression molded into slabs with 170 megapascals applied pressure, and then cured for 15 minutes at 175 degrees C. The molded slabs are cut into rectangular samples with dimensions approximately 3 mm thick, 25 mm wide, and 70 mm in length. Conductive silver paint, (DuPont™ grade 4817N) is used to apply electrodes on these samples across the width and thickness, separated by a distance of 50 millimeters. After curing, electrical leads are connected to the silver electrodes with clips. The resistance of the samples is measured with a two wire resistance meter. The volume resistivity is calculated from the measured resistance, the length between the electrodes (50 mm), and the cross sectional area of the sample (75 mm$^2$). Resistance is measured at high temperatures by placing the sample inside a laboratory oven.

The volume resistivity of Examples 5 to 8 is measured at room temperature, and at 90 and 130 degrees C. after exposure in the oven for 1 and 15 days. After 15 days, the samples are removed from the oven and allowed to cool for one day at room temperature, at which time the resistance is measured again. The results of these measurements on Examples 5 to 8 are shown in Table 2. The coefficient of variation (i.e., standard deviation divided by the mean result) for this test method is approximately 10 percent. Relative differences less than 20 percent are not significant.

TABLE 2

| Example Number | 5 | 6 | 7 | 8 |
|---|---|---|---|---|
| Composition, weight percent | | | | |
| Example 1 | 98.9 | | | |
| Example 2 | | 98.9 | | |
| Example 3 | | | 98.9 | |
| Example 4 | | | | 98.9 |
| dicumyl peroxide | 1.1 | 1.1 | 1.1 | 1.1 |
| Total: | 100.0 | 100.0 | 100.0 | 100.0 |
| Volume Resistivity (ohm centimeters) | | | | |
| at 23° C. | 13 | 4.0 | 67 | 14 |
| at 90° C., 1 day exposure | 50 | 4.2 | 150 | 19 |
| at 90° C., 15 days exposure | 47 | | 150 | 20 |
| at 23° C., after 15 days at 90° C. | 13 | | 82 | 17 |
| at 130° C., 1 day exposure | 260 | 5.6 | 220 | 18 |
| at 130° C., 15 days exposure | 250 | | 200 | 18 |
| at 23° C., after 15 days at 130° C. | 28 | | 110 | 17 |

The volume resistivity of the semiconductive shield on insulated power cable should be as low as possible. The dielectric loss factor of the cable, when used for AC electrical power transmission at voltages greater than 5 kV, is related to the volume resistivity of the shield layers. As the resistivity is increased, the dissipation factor also increases. It is desirable to minimize the dielectric loss of the power cable, and hence, it is desirable to minimize the volume resistivity.

Example 5 shows the volume resistivity for materials which are used commercially to shield power cables. The volume resistivity of the crosslinked semiconductive material increases with temperature, and remains stable after exposure to high temperatures for an extended period of time. After exposure to 130 degrees C. and cooling down to room temperature, this material exhibits a significant increase in volume resistivity, which is undesirable.

Example 7 exhibits behavior similar to Example 5 except that there is less of a relative increase in volume resistivity with temperature, and less relative permanent increase in the room temperature volume resistivity after the temperature cycle. Even though the absolute value of volume resistivity for Example 7 is higher than Example 5, the stability of volume resistivity with temperature cycling and time is very desirable.

Example 8 exhibits superior volume resistivity characteristics relative to Example 5. This semiconductive composition exhibits very little temperature dependence on volume resistivity, and essentially no change in volume resistivity after temperature cycling.

The lower absolute volume resistivity and improved thermal stability of volume resistivity of Example 8 is highly desirable behavior, and is unexpected, especially when viewed in light of the lower viscosity measured on this composition in Example 4.

Carbon Black/Carbon Nanotube Loading Level Tests

Semiconducting polymer compositions comprising an ethylene-ethylene acetate polymer having 15 wt % ethylene acetate and a melt index of 1.5 g/10 minutes at 120 C/21.6 kg were compounded with several loading levels of carbon nanotubes and carbon black. The carbon black was the commercially available product Cabot™ XC-500 having a DBP absorption of 160 cc/100 g and an iodine adsorption of 75 mg/g. The carbon nanotubes used are multi-walled and are commercially from Hyperion Catalysis International. The carbon nanotubes had a DBP absorption of about 450 cc/100 g.

The nanotubes were added as a master batch of the 17 wt % multi-walled carbon tubes in EVA. The semiconducting polymer compositions were prepared in a Brabender™ batch mixer at 150 C and 50 RPM in a 300 g bowl.

FIG. 1 shows the melt index (ASTM D1238) of the semiconducting compositions. The compositions were made with various ratios of carbon black and carbon nanotubes. FIG. 1 shows that when a composition is prepared with carbon nanotubes (in the absence of carbon black) to achieve carbon concentration of 17 weight percent, the resulting semiconducting composition has an extremely low melt index and cannot undergo conventional processing.

FIG. 1 also shows that compositions made with blends of carbon nanotubes and carbon black to achieve a carbon concentration of greater than about 17 weight percent have sufficiently high melt indexes to permit their conventional processing. Notably, compositions made with blends of carbon nanotubes and carbon black, wherein the carbon black concentration is about 10 weight percent or less, have melt indexes substantially similar to that of the composition without any carbon black added. Therefore, conductivity of the compositions can be increased without adversely impacting processing.

FIG. 2 shows the volume resistivity (ASTM D991, ICEA S-66-524) of semiconducting compositions at the various carbon nanotube/carbon black loading levels. FIG. 2 specifically shows that compositions containing 15 weight percent or less of carbon black (in the absence of carbon nanotubes) do not show any change in volume resitivity. Additionally, compositions containing 17 weight percent or less of carbon nanotubes (in the absence of carbon black) do not show any change in volume resitivity. FIG. 2 further shoes that compostions made with (i) a blend of carbon nanotubes, having a weight percent greater than about 1 weight percent, and carbon black, having a weight percent greater than about 10 weight percent, show a change in volume resitivity or (ii) a blend of carbon nanotubes, having a weight percent greater than about 3 weight percent, and carbon black, having a weight percent greater than about 5, show a change in volume resitivity, This volume resitivity change occurs even though the total carbon concentration from the blend can be less than 15 weight percent.

What is claimed is:

1. A cable comprising one or more electrical conductors, communications media or a core, each electrical conductor, communications medium, or core being surrounded by a layer comprising:
   (a) a linear low density polyethylene resin;
   (b) an ethylene/ethyl acrylate copolymer resin;
   (c) carbon nanotubes present in an amount such that the weight ratio of carbon nanotubes to the total weight of components (a) and (b) is at least about 1:7;
   (d) a conductive carbon black other than carbon nanotubes, the carbon black present in an amount such that the weight ratio of carbon black to the total weight of components (a) and (b) is about 1.9:7; and
   (e) optionally, (i) a copolymer of acrylonitrile and butadiene wherein the acrylonitrile is present in an amount of about 30 to about 60 percent by weight based on the weight of the copolymer or (ii) a silicone rubber.

2. The cable defined in claim 1 wherein the layer is a semiconducting shield and component (c) is present in an amount of about 14 to about 100 parts by weight per 100 parts by weight of the total weight of component (a) and component (b).

* * * * *